(12) United States Patent
Noble, Jr.

(10) Patent No.: US 8,036,374 B2
(45) Date of Patent: Oct. 11, 2011

(54) SYSTEMS AND METHODS FOR DETECTING CALL BLOCKING DEVICES OR SERVICES

(75) Inventor: James K. Noble, Jr., Marietta, GA (US)

(73) Assignee: Noble Systems Corporation, Atlanta, GA (US)

( * ) Notice: Subject to any disclaimer, the term of this patent is extended or adjusted under 35 U.S.C. 154(b) by 1161 days.

(21) Appl. No.: 11/290,978

(22) Filed: Nov. 30, 2005

(65) Prior Publication Data

US 2006/0256945 A1 Nov. 16, 2006

Related U.S. Application Data

(60) Provisional application No. 60/681,409, filed on May 16, 2005.

(51) Int. Cl.
*H04M 1/56* (2006.01)
(52) U.S. Cl. .......... 379/266.08; 379/142.01; 379/210.02
(58) Field of Classification Search .............. 379/266.01, 379/266.08, 386, 210.01
See application file for complete search history.

(56) References Cited

U.S. PATENT DOCUMENTS

| | | | |
|---|---|---|---|
| 3,784,721 A * | 1/1974 | Kilby | 379/74 |
| 4,788,715 A | 11/1988 | Lee | |
| 4,800,583 A | 1/1989 | Theis | |
| 4,829,563 A | 5/1989 | Crockett et al. | |
| 4,881,261 A | 11/1989 | Oliphant et al. | |
| 4,896,345 A | 1/1990 | Thorne | |
| 5,020,095 A | 5/1991 | Morganstein et al. | |
| 5,036,535 A | 7/1991 | Gechter et al. | |
| 5,070,525 A * | 12/1991 | Szlam et al. | 379/196 |

(Continued)

FOREIGN PATENT DOCUMENTS

| | | |
|---|---|---|
| WO | W003/028356 A1 | 4/2003 |
| WO | WO 03/028356 A1 | 4/2003 |
| WO | W02004/017620 A1 | 2/2004 |

OTHER PUBLICATIONS

Aspect, "Aspect Scheduled Callback," copyrighted Jan. 2005, Aspect Communications Corporation (4 pages).
Avaya, "IP Office Compact Center Software Version 4," website: http://support.avaya.com/japple/css/japple?temp.documentID=153559&temp..., downloaded May 10, 2005 (15 pages).

(Continued)

*Primary Examiner* — Ahmad F Matar
*Assistant Examiner* — Jirapon Intavong
(74) *Attorney, Agent, or Firm* — Sutherland Asbill & Brennan LLP

(57) ABSTRACT

Systems and methods for detecting call blocking devices or services. The devices monitor outbound call connections to determine if a connected call has been answered by a call blocking device or service rather than a person or answering machine. The verification is a comparison between the connection of an outbound call and a predefined parameter of data associated with that connection. For example, the predefined timing parameter may require detecting a connection before the first ring, or a connection occur within a predetermine period of time from when the outbound call is placed, or a connection occurring after a certain number of rings, etc. Which predefined parameter is associated with a particular outbound call may depend on the call blocking device or service the call center placing the outbound call expects to encounter on a particular connection attempt of a particular phone number. Once the call blocking device or service has been detected on a connected call, the call can be process as if a connection occurred including routing such calls to an available agent or other handling process customized to handle such calls such as automatically navigating prompts for voice or dialing responses from the privacy director systems.

11 Claims, 2 Drawing Sheets

U.S. PATENT DOCUMENTS

| | | |
|---|---|---|
| 5,181,236 A | 1/1993 | LaVallee et al. |
| 5,185,782 A | 2/1993 | Srinivasan |
| 5,206,903 A | 4/1993 | Kohler et al. |
| 5,274,700 A * | 12/1993 | Gechter et al. ............ 379/211.01 |
| 5,309,505 A | 5/1994 | Szlam et al. |
| 5,371,787 A | 12/1994 | Hamilton |
| 5,404,400 A * | 4/1995 | Hamilton ..................... 379/386 |
| 5,425,093 A | 6/1995 | Trefzger |
| 5,436,965 A | 7/1995 | Grossman et al. |
| 5,479,487 A | 12/1995 | Hammond |
| 5,495,284 A | 2/1996 | Katz |
| 5,519,773 A | 5/1996 | Dumas et al. |
| 5,533,109 A | 7/1996 | Baker |
| 5,537,470 A | 7/1996 | Lee |
| 5,544,220 A | 8/1996 | Trefgzer |
| 5,553,133 A | 9/1996 | Perkins |
| 5,559,878 A | 9/1996 | Keys et al. |
| 5,581,602 A | 12/1996 | Szlam et al. |
| 5,594,791 A | 1/1997 | Szlam et al. |
| 5,625,682 A | 4/1997 | Gray et al. |
| 5,627,884 A | 5/1997 | Williams et al. |
| 5,633,922 A | 5/1997 | August et al. |
| 5,640,445 A | 6/1997 | David |
| 5,703,935 A | 12/1997 | Raissyan et al. |
| 5,703,943 A | 12/1997 | Otto |
| 5,724,420 A | 3/1998 | Torgrim |
| 5,761,289 A | 6/1998 | Keshav |
| 5,784,452 A | 7/1998 | Carney |
| 5,809,128 A | 9/1998 | McMullin |
| 5,815,566 A | 9/1998 | Ramot et al. |
| 5,822,400 A | 10/1998 | Smith |
| 5,825,869 A | 10/1998 | Brooks et al. |
| 5,828,731 A * | 10/1998 | Szlam et al. ............... 379/88.16 |
| 5,870,464 A | 2/1999 | Brewster et al. |
| 5,958,014 A | 9/1999 | Cave |
| RE36,416 E | 11/1999 | Szlam |
| 6,002,760 A | 12/1999 | Gisby |
| 6,101,251 A * | 8/2000 | Strickland ................ 379/213.01 |
| 6,111,940 A | 8/2000 | Kugell |
| 6,170,011 B1 | 1/2001 | Macleod Beck et al. |
| RE37,073 E | 2/2001 | Hammond |
| 6,192,050 B1 | 2/2001 | Stovall |
| 6,208,970 B1 | 3/2001 | Ramanan |
| 6,212,268 B1 | 4/2001 | Nielsen |
| 6,226,360 B1 | 5/2001 | Goldberg et al. |
| 6,233,319 B1 | 5/2001 | Cox et al. |
| 6,259,786 B1 | 7/2001 | Gisby |
| 6,263,066 B1 | 7/2001 | Shtivelman et al. |
| 6,292,551 B1 | 9/2001 | Entman et al. |
| 6,324,262 B1 | 11/2001 | Tuttle |
| 6,408,066 B1 | 6/2002 | Andruska et al. |
| 6,411,805 B1 | 6/2002 | Becker et al. |
| 6,418,217 B1 | 7/2002 | Ukon |
| 6,493,447 B1 | 12/2002 | Goss et al. |
| 6,546,097 B1 | 4/2003 | Peltz |
| 6,570,975 B2 | 5/2003 | Shaffer et al. |
| 6,574,329 B2 | 6/2003 | Takeuchi |
| 6,600,821 B1 | 7/2003 | Chan et al. |
| 6,633,639 B1 | 10/2003 | Ludford |
| 6,636,598 B1 | 10/2003 | Thomson et al. |
| 6,650,748 B1 | 11/2003 | Edwards et al. |
| 6,654,367 B1 | 11/2003 | Kaufman |
| 6,654,457 B1 | 11/2003 | Beddus et al. |
| 6,681,006 B1 | 1/2004 | Pilkington et al. |
| 6,704,404 B1 | 3/2004 | Burnett |
| 6,707,906 B1 | 3/2004 | Ben-Chanoch |
| 6,714,643 B1 | 3/2004 | Gargeya et al. |
| 6,721,778 B1 | 4/2004 | Smith et al. |
| 6,724,885 B1 | 4/2004 | Deutsch et al. |
| 6,744,881 B1 | 6/2004 | Price |
| 6,748,074 B2 | 6/2004 | Khan |
| 6,754,334 B2 | 6/2004 | Williams et al. |
| 6,771,760 B1 | 8/2004 | Vortman et al. |
| 6,775,364 B2 | 8/2004 | Knox |
| 6,782,087 B1 | 8/2004 | Atkinson et al. |
| 6,782,092 B2 | 8/2004 | Mashimo et al. |
| 6,782,358 B2 | 8/2004 | Cox et al. |
| 6,801,520 B2 | 10/2004 | Philonenko |
| 6,804,346 B1 | 10/2004 | Mewhinney |
| 6,813,349 B2 | 11/2004 | Johnson et al. |
| 6,822,945 B2 | 11/2004 | Petrovykh |
| 6,826,194 B1 | 11/2004 | Vered et al. |
| 6,826,529 B1 | 11/2004 | Zhang et al. |
| 6,832,203 B1 | 12/2004 | Villena et al. |
| 6,847,712 B2 | 1/2005 | Mashimo et al. |
| 6,847,713 B1 | 1/2005 | Cutting et al. |
| 6,850,602 B1 * | 2/2005 | Chou ............................. 379/80 |
| 6,850,615 B1 | 2/2005 | Patel et al. |
| 6,865,258 B1 | 3/2005 | Polcyn |
| 6,868,395 B1 | 3/2005 | Szlam et al. |
| 6,870,924 B1 | 3/2005 | Ukon |
| 6,879,674 B2 | 4/2005 | Strandberg |
| 6,879,683 B1 | 4/2005 | Fain et al. |
| 6,885,741 B1 | 4/2005 | Puckett et al. |
| 6,925,607 B2 | 8/2005 | Szlam et al. |
| 6,931,112 B1 | 8/2005 | McFarland et al. |
| 6,950,505 B2 | 9/2005 | Longman et al. |
| 6,965,669 B2 | 11/2005 | Bickford et al. |
| 7,010,115 B2 | 3/2006 | Dezonno et al. |
| 7,046,789 B1 | 5/2006 | Anderson et al. |
| 7,050,566 B2 | 5/2006 | Becerra et al. |
| 7,050,568 B2 | 5/2006 | Brown et al. |
| 7,054,419 B2 | 5/2006 | Cullis |
| 7,080,321 B2 | 7/2006 | Aleksander et al. |
| 7,106,851 B2 | 9/2006 | Tang et al. |
| 7,133,828 B2 | 11/2006 | Scarano et al. |
| 7,145,998 B1 | 12/2006 | Holder et al. |
| 7,158,630 B2 | 1/2007 | Fotta et al. |
| 7,190,774 B2 | 3/2007 | McFarland |
| 7,215,745 B2 | 5/2007 | Peters |
| 7,221,739 B1 | 5/2007 | Khan et al. |
| 7,221,753 B2 | 5/2007 | Hutton et al. |
| 7,224,791 B2 | 5/2007 | Haukilahti |
| 7,231,232 B2 | 6/2007 | Osann, Jr. |
| 7,236,577 B2 | 6/2007 | Lection et al. |
| 7,242,760 B2 | 7/2007 | Shires |
| 7,245,711 B2 | 7/2007 | Margolis |
| 7,257,217 B1 | 8/2007 | Lee |
| 7,266,181 B1 | 9/2007 | Zirngibl et al. |
| 7,266,183 B1 | 9/2007 | Jones, IV |
| 7,272,212 B2 | 9/2007 | Eberle et al. |
| 7,274,672 B2 | 9/2007 | Lyonnaz |
| 7,274,787 B1 | 9/2007 | Schoenegerger |
| 7,302,051 B1 | 11/2007 | Strandberg |
| 7,315,518 B1 | 1/2008 | Siegrist |
| 7,324,528 B1 | 1/2008 | Szlam |
| 7,327,831 B2 | 2/2008 | Tobin |
| 7,362,854 B2 | 4/2008 | Mcknight |
| 7,369,650 B1 | 5/2008 | Bhusri |
| 7,372,957 B2 | 5/2008 | Strathmeyer et al. |
| 7,376,226 B2 | 5/2008 | Holder et al. |
| 7,389,254 B2 | 6/2008 | McCleery |
| 7,426,268 B2 | 9/2008 | Walker et al. |
| 7,454,004 B2 | 11/2008 | Shvadron |
| 7,457,396 B2 | 11/2008 | Claudatos et al. |
| 2002/0085686 A1 | 7/2002 | Cullis |
| 2002/0085700 A1 * | 7/2002 | Metcalf .................... 379/210.01 |
| 2003/0002651 A1 | 1/2003 | Shires |
| 2003/0169870 A1 | 9/2003 | Stanford |
| 2003/0217014 A1 * | 11/2003 | Mollett et al. .................. 705/75 |
| 2004/0081311 A1 | 4/2004 | Thompson |
| 2004/0111310 A1 | 6/2004 | Szlam et al. |
| 2004/0114747 A1 | 6/2004 | Trandal et al. |
| 2004/0133434 A1 | 7/2004 | Szlam et al. |
| 2004/0170258 A1 * | 9/2004 | Levin et al. ................ 379/88.01 |
| 2004/0179672 A1 | 9/2004 | Pagel et al. |
| 2004/0218750 A1 | 11/2004 | Atkinson et al. |
| 2004/0228470 A1 | 11/2004 | Williams et al. |
| 2005/0002515 A1 | 1/2005 | Mewhinney et al. |
| 2005/0063529 A1 | 3/2005 | Meldrum et al. |
| 2005/0074114 A1 | 4/2005 | Fotta et al. |
| 2005/0207548 A1 * | 9/2005 | Moore et al. ................. 379/112.1 |
| 2005/0278177 A1 | 12/2005 | Gottesman |
| 2006/0002538 A1 | 1/2006 | Dezonno |
| 2006/0029203 A1 | 2/2006 | Bhusri |
| 2006/0104433 A1 | 5/2006 | Simpson et al. |

| | | |
|---|---|---|
| 2006/0140375 A1 | 6/2006 | Paden et al. |
| 2006/0167729 A1 | 7/2006 | Rafter et al. |
| 2006/0256932 A1 | 11/2006 | Bushey et al. |
| 2006/0256945 A1 | 11/2006 | Noble |
| 2007/0291924 A1 | 12/2007 | Matula |
| 2008/0226055 A1 | 9/2008 | Holder et al. |
| 2009/0010414 A1 | 1/2009 | Siegrist |
| 2009/0022284 A1 | 1/2009 | Matula |

OTHER PUBLICATIONS

Servion, "Servion Announces Callback Manager with Natural Language Interface," website: http://www.servion.com/news26.htm, downloaded May 10, 2005 (2 pages).

Alston Tascom, Inc., "Evolution Outbound Dialing," 13512 Vintage PI, Chino, CA 91710, website: www.alstontascom.com (2 pages).

* cited by examiner

SYSTEMS AND METHODS FOR DETECTING CALL BLOCKING DEVICES OR SERVICES

RELATED APPLICATIONS

The present application claims priority to U.S. Provisional Patent Application Ser. No. 60/681,409, filed May 16, 2005, which is hereby incorporated by reference as if set forth fully herein.

FIELD OF THE INVENTION

The invention is related to the field of telephony and communications. More particularly, the invention relates to automated call distribution technology.

BACKGROUND OF THE INVENTION

Traditional methods for detecting the difference between an answering machine and a human answering a telephone line, like those described in U.S. Pat. No. 5,371,787 and 5,724,420, have become less effective with the introduction of certain new technologies, particularly "Privacy Directors" or similar call blocking devices or services, voicemail services, or similar services offered by local telephone companies. These privacy director services typically intercept calls to a telephone number usually on a selective basis (such as unknown numbers or numbers not on an allowed list) and prompt the caller to speak their name in order to be connected to the called party. With the methods of detecting answering machines such as those described in the above patents, calls answered by privacy directors will typically be falsely classified as an answering machine. Therefore, a contact will not be made with the called party, unless outbound calls from a call center that detect an answering machine are connected to live agents for the agent to deduce whether it is a privacy director service or an answering machine. However, sending answering machine calls to live agents greatly reduces agent productivity. Thus, there is an unsatisfied need for automated call systems to properly distinguish between call blocking services and answering machines.

SUMMARY OF THE INVENTION

The present invention is directed to systems and methods for detecting call blocking devices or services such as privacy director services, voicemail services, or similar services offered by local telephone companies, wherein a method according to an embodiment of the present invention includes the steps of placing an outbound call on a telephone line and monitoring the telephone line for a connection of that outbound call. The placing of the call may be done automatically by a predictive dialer, and the monitoring of the telephone line may also be done by a predictive dialer. If a connection occurs within predefined timing parameter such as a predefined period of time from when the call is placed or before a predefined number of rings, then the call may be considered to have been answered by a call blocking device or service and is processed accordingly. Such processing may include routing the call to an agent. Additionally, calls which encounter call blocking devices or services that prompt callers to enter caller identification data (e.g., caller's name, account number, confirmation number, purchase order number, the purpose of the call, etc.) may be detected and routed to live agents, who can navigate the prompts for caller identification data themselves, or special software routines may be utilized to navigate the prompts of known call blocking devices or services.

In alternative embodiments, the predefined timing parameter may be associated with either the outbound call itself or telephone network on which the call is placed. Moreover, the predefined timing parameter may be defined by being before a predetermined number of rings and/or being within a predetermine period of time from when the call is placed. Other periods of time may also be utilized. The present invention can be utilized with a variety of telephone networks including networks that use analog or digital telephone lines, and networks that include Voice over IP or (VOIP) protocol.

The present invention may be implemented as a call center that includes a predictive dialer, a telephone line interface that connects the call center to a telephone network, a first processor that monitors a telephone line to determine if a connection occurred before a predefined parameter, one or more agents connected to the call center, and an interface that routes a call to an agent based at least in part on when the connection occurred. In alternative embodiments of the present invention, the call center may include, or work in conjunction with, a router that routes a call to an agent based at least in part on when the connection occurred. The router can be operable with one or more of the call center's interfaces, or, alternatively, the router can route calls to agents independent of the call center interfaces.

BRIEF DESCRIPTION OF THE DRAWINGS

Figure 1:
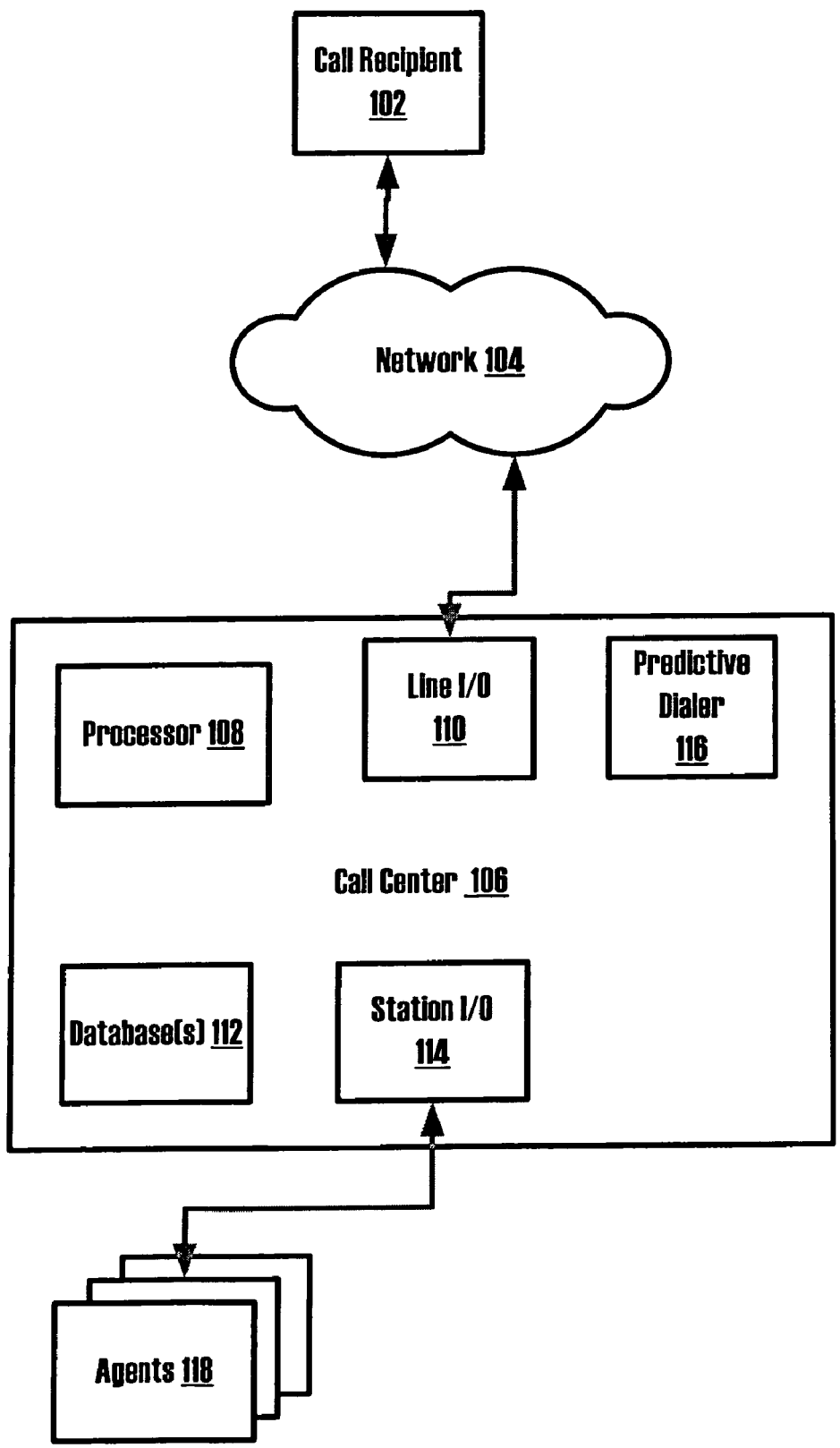

Having thus described the invention in general terms, reference will now be made to the accompanying drawings, which are not necessarily drawn to scale, and wherein:

FIG. 1 is a functional block diagram showing a call center with a predictive dialer for detecting privacy director services and other call blocking services or devices, in accordance with an exemplary embodiment of the present invention.

Figure 2:
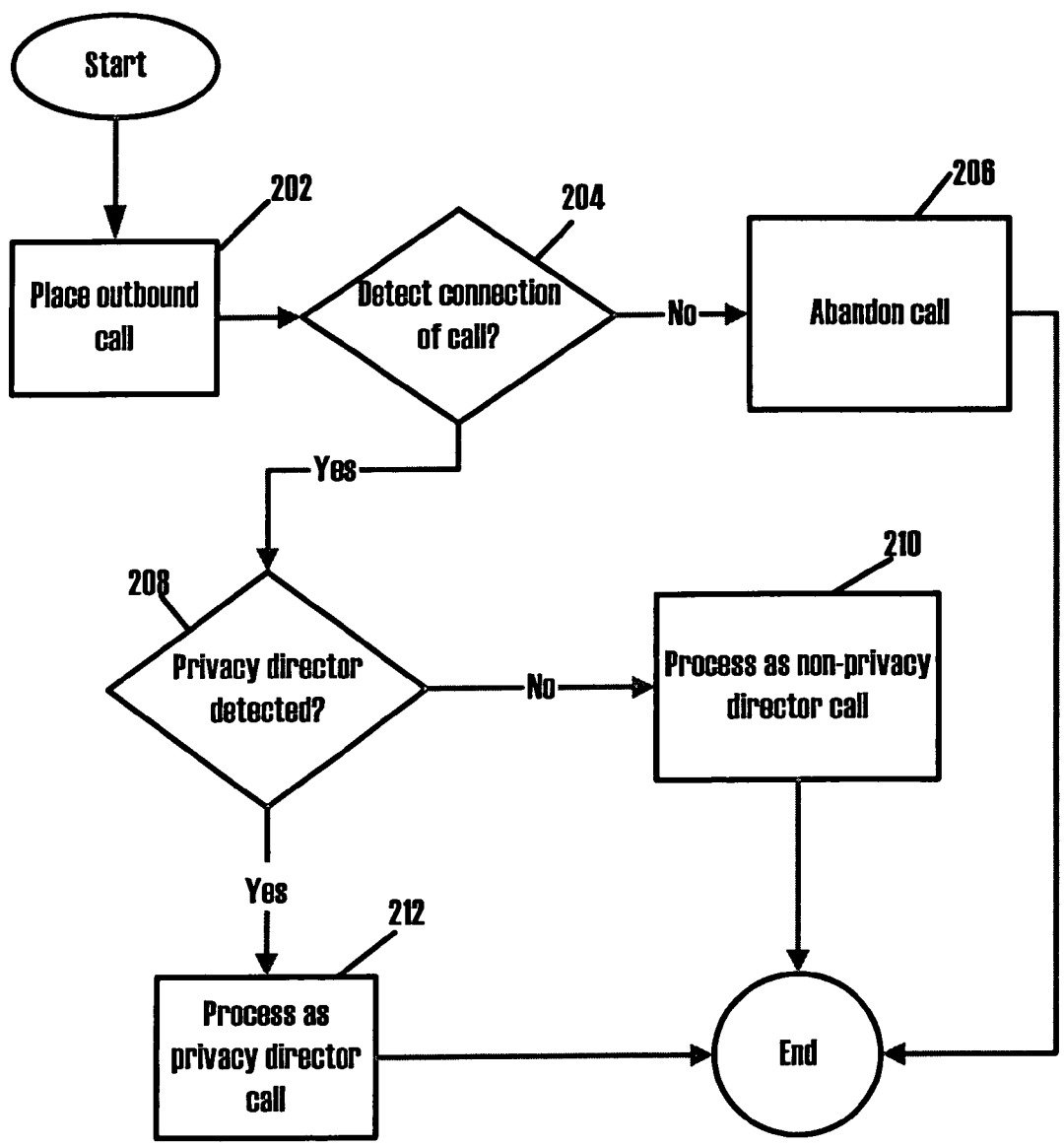

FIG. 2 is a flowchart of a process for detecting the privacy director services and other call blocking services or devices, in accordance with an exemplary embodiment of the present invention.

DETAILED DESCRIPTION OF THE PRESENT INVENTION

An exemplary system for implementing the present invention is shown in FIG. 1. FIG. 2 shows an exemplary embodiment of a method using the system of FIG. 1 for determining if a telephone call is answered by an answering machine or a call blocking devices or services such as privacy director services, voicemail services, or similar services offered by local telephone companies. For the purposes of describing the present invention the term call blocking device or service includes privacy director services, voicemail services, or similar services offered by local telephone companies, and such terms as they are utilized throughout this specification are interchangeable. The present invention is described below with reference to figures and flowchart illustrations of systems, methods, apparatuses and computer program products according to an embodiment of the invention. It will be understood that each block of the flowchart illustrations, and combinations of blocks in the flowchart illustrations, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions. The inventions may be implemented through an application program running on an operating system of a computer. The inventions also may be practiced with other computer system configurations, including hand-held devices, multiprocessor systems, microprocessor based or programmable consumer electronics, mini-computers, mainframe computers, etc.

Application programs that are components of the invention may include routines, programs, components, data structures, etc. that implements certain abstract data types, perform certain tasks, actions, or tasks. In a distributed computing environment, the application program (in whole or in part) may be located in local memory, or in other storage. In addition, or in the alternative, the application program (in whole or in part) may be located in remote memory or in storage to allow for the practice of the inventions where tasks are performed by remote processing devices linked through a communications network.

The present invention will now be described more fully hereinafter with reference to the accompanying figures, in which like numerals indicate like elements throughout the several drawings. Some, but not all embodiments of the invention are described. Indeed, these inventions may be embodied in many different forms and should not be construed as limited to the embodiments set forth herein; rather, these embodiments are provided so that this disclosure will satisfy applicable legal requirements, be thorough and complete, and will fully convey the scope of the invention to those skilled in the art.

With reference to FIG. 1, the system in accordance with an embodiment of the present invention includes a call center 106 in communication both with agents 118 and call recipients 102. The call center 106 includes a processor 108 with associated memory such as one or more database 112, a predictive dialer 116 for automatically placing calls, and line interfaces 110 and station interfaces 114 for providing bi-directional communication with call recipients 102 and agents 118, respectively. The call center processor 108 runs software from its associated memory, such as database 112, to control the operations of the control center 106, such as the predictive dialer 116, and the routing of calls between agents 118 and call recipients 102.

In the illustrative embodiment, the databases 112 stores computer program code, and the program code can be designed to implement the method described below in connection with FIG. 2. The databases 112 may also store call recipient information such as phone numbers, previous call information, statistical data, information related to the subject of a call, etc. The databases 112 can be located with or remote to the call center 106. Further, in an alternative embodiment, one or more of the call center operations can be controlled remotely by a remote server, computer, etc.

The call center 106 uses its interfaces 110 and 114 to connect the call recipients 102 and agents 118. The line interface 110 connects the predictive dialer 116 to a network 104, and the station interface 114 routes connected outbound calls to one or more agents 118 connected to the call center 106. In an alternative embodiment of the present invention, a router, located within or remote from the call center 106 may be used to route calls directly from the line interface 110 or predictive dialer 116 to the station interface 114 or directly to the agents 118 themselves. The call center 106 automatically places telephone calls over a network 104, such as the public switch telephone network (PSTN), cellular network, Internet, etc. through the use of one or more predictive dialers 116. The placed telephone calls can be transmitted over analog transmission lines, digital transmission lines, or both. It is also understood that such calls can be transmitted over a Voice over IP (VoIP) network. A predictive dialer 116 initiates a call and its associated hardware (e.g., a digital signal processor) monitors the progress of the call (e.g., connection to a person, connection to a machine, busy signal, no connection, disconnected tones or not in service tones, or other signals, etc.). The hardware used to monitor an initiated call may utilize the call center processor 108, the predictive dialer 116 itself, or hardware associated with the predictive dialer 116 such as dedicated ASIC chip(s), digital signal processor(s), PIC processors or an associated monitoring device controlled by the call center processor 108 as well as analog-to-digital and digital-to-analog converters depending on the transmission line being used. The network 104 routes the call to the appropriate call recipient 102. The call center 106 monitors the call over the line interface 110, and when the call center 106 determines that a call should be handled by an live agent it routes the call on the line to an agent 116 by way of the station interfaces 114. In alternative embodiments of the present invention, a live agent can then navigate the privacy director service prompts to complete the call, or perform other operations to complete the call.

To implement the privacy director detection method, which is described in further below with reference to FIG. 2, the call center 106 initiates a call over the network 104 through the use of its predictive dialer 116. The call is monitored at the call center 106 by way of the line interface 110. If a connection is establish before the first ring occurs on the line (or in manner that meets some other predefined parameter, which is discussed below), then the call is determined to be a privacy director service call. The call center 106 then processes the call accordingly. This detection of a connected call is provided for by the processor 108, predictive dialer 116, or another processor such as a digital signal processor, dedicated ASIC, or PIC processor located within or remote from the call center 106 located in FIG. 1.

FIG. 2 shows an exemplary method for conducting such an inquiry in accordance with the present invention. The process starts at step 202, which places an outbound call on a telephone line preferably through the use of an automatic dialing system. Next, step 204 is invoked to monitor the telephone line to detect a connection of the call, that is, a received or connected call signal. Such monitoring can be done by monitoring signals received from the telephone network or through the use of digital signal processors monitoring the line. If no connection is detected then step 206 processes the call accordingly, such as by abandoning the call. If a connection has been detected, then step 208 conducts a privacy director inquiry in accordance with an embodiment of the present invention.

Many current privacy director services intercept the call before the first ring, while most answering machines answer after the third or fourth ring. This distinctive characteristic of privacy director services in relation to typical answering machine operating characteristics was discovered by the present inventor. This relationship has been utilized in the present invention to detect privacy director services by their distinct operating characteristics, such as what period of time does it take for the particular privacy director to connect to the outbound call, or how many rings (if any) occur before the privacy director connects to the outbound call, etc. These operating characteristics may be incorporated into the privacy director service detection system through the use of configurable parameters or algorithms, referred to herein as the predefined timing parameter(s). Configuring the appropriate parameters or algorithms for the detection of a particular privacy director service can be based at least in part on one or more of these factors, and can also include the consideration of one or more of the following: the telephone network being used, the number being dialed, the reason for the call, the popularity of a specific privacy director protocol, or through additional inquiries or monitoring of the line through the use of digital signal processors and voice recognition software, etc.

Thus, in accordance with an aspect of the present invention, the detection of a privacy director device or service can be based on the detection of a call connect signal within a predetermined number of seconds of when the call is placed, or before a predetermined number of rings (e.g., before a second ring or before the third ring, etc.). For illustrative purposes, in an embodiment of the present invention the inquiry of step 208 may include the determination of whether the connection of the call occurs before the first ring or not. If a connection does not occur before the first ring, then step 210 is invoked and the call is processed as if a privacy director service is not associated with that particular call. If detection of a connection occurs before the first ring, then the detected answer may be classified as a privacy director service, thereby invoking step 212 so that the call can be processed differently than calls answered by an answering machine.

The detection of a call connected signal can occur in a variety of ways based in part on the type of network (analog or digital) the connection is operating. An example of how a "call connected" signal may be detected on an analog network can be a drop in loop current. In digital networks, a call connected signal may be acquired from the control channel in the group of dedicated digital lines being used. The control channel is a data channel that includes flags (or bits) that can be set or switched when a call has been connected. Another example of detecting when a call has been answered on digital networks involves the use of in-band signaling (e.g., allocating bits from the voice data transmission for signaling purposes and monitoring the allocated portion of the transmitted signal to determine if a call had been answered), and/or the use of channel associated signaling (CAS) protocol.

If based on the timing of the call connect signal it is determined that a privacy director device or service has answered the call, then the call is processed at step 212 as a privacy director call. A privacy director call may be processed in any suitable way, such as by transferring the call to a live agent to handle the call. The agent can be selected from a particular group dedicated to handle such calls or selected based on availability, skill, nature of the call, etc. Alternatively, the handling of a privacy director call can be automated by the transmission of touch tones or voice recordings to the privacy director at an appropriate time and in an appropriate sequence to allow the call to complete without involving a human agent. For automation, the timing and signals transmitted and the message transmitted is configurable based upon, for example, the reason for the call and the telephone number to which the call was placed (i.e., privacy directors in the Bellsouth service may require a "1" to be pressed and then a name to be spoken, and other areas may require a different process to complete the call). Alternatively, the popularity of certain privacy director devices or a protocol used by such devices may be taken into consideration, and where appropriate, the timing of the call connect signal or other distinctive information about the answered call (e.g., the first word played by the device or service) may be utilized initially to determine which protocol to utilize. That is, in a market where the local telephone service provider offers a privacy director service or a third party privacy director service may be utilized, the timing of the call connect signal and/or other information gleaned from the answered call can be utilized to effectively process the call, including the determination of which protocol to utilize. More complex automation can be achieved with the use of digital signal processors and voice recognition software. In addition, appropriate checks can be made to avoid calls to cell phones.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of detecting call blocking devices or services comprising:
   placing an outbound call on a telephone line, wherein placing comprises placing the outbound call with a predictive dialer;
   monitoring the telephone line for a call connected signal on the outbound call; and
   determining that the outbound call is connected to the call blocking service provided by a telephone company or other third party service, based on whether the call connected signal on the outbound call is detected within a predefined timing parameter, wherein the predefined timing parameter indicates the call is connected to the call blocking service before a first ring.

2. The method of claim 1, wherein monitoring comprises monitoring with a predictive dialer.

3. The method of claim 1, further comprising routing the outbound call to an agent.

4. The method of claim 1, further comprising associating the predefined timing parameter with the outbound call known to be associated with a particular call blocking device or service.

5. The method of claim 1, further comprising associating the predefined timing parameter with the telephone network on which the outbound call is placed known to be associated with a particular call blocking device or service.

6. The method of claim 1, further comprising receiving automated prompts of a call blocking device for the entry of caller identification data.

7. The method of claim 6, further comprising navigating the automated prompts of a call blocking device to complete the outbound call.

8. A call center, comprising:
a predictive dialer that places outbound calls on a telephone network;
a processor that monitors an outbound call to determine when a connection occurs, and determines that the outbound call is connected to a call blocking service provided by a telephone company or other third party service based on whether a call connected signal on the outbound call is detected within a predefined timing parameter, wherein the predefined timing parameter indicates the call is connected before a first ring; and
at least one interface that connects the predictive dialer to the telephone network and operable to route the outbound call to an agent.

9. The call center of claim 8, wherein the at least one interface includes a station interface that connects one or more agents to the call center.

10. The call center of claim 8, wherein the at least one interface includes a line interface that connects the call center to a telephone network.

11. The call center of claim 8, wherein the at least one interface includes a router that routes an outbound call to the agent.

* * * * *